United States Patent [19]

Nakamura et al.

[11] 4,359,022

[45] Nov. 16, 1982

[54] VALVE FOR AN INTERNAL COMBUSTION ENGINE

[75] Inventors: Kiyoshi Nakamura; Masae Nakanishi; Syozo Kawasaki, all of Yokohama; Toshihiko Ochiai, Yokosuka; Katsutoshi Nishida, Yokohama, all of Japan

[73] Assignee: Tokyo Shibaura Denki Kabushiki Kaisha, Kawasaki, Japan

[21] Appl. No.: 131,276

[22] Filed: Mar. 17, 1980

[30] Foreign Application Priority Data

Aug. 2, 1979 [JP] Japan ................................. 54/98095

[51] Int. Cl.$^3$ ............................................... F01L 3/02
[52] U.S. Cl. .............................. 123/188 AA; 251/368
[58] Field of Search ................ 123/188 AA, 668, 669; 29/156.7 R; 251/368

[56] References Cited

U.S. PATENT DOCUMENTS

| | | | |
|---|---|---|---|
| 1,559,439 | 10/1925 | Kapraun | 123/668 |
| 2,595,671 | 5/1952 | Greene | 251/368 |
| 3,066,663 | 12/1962 | Rudy | 123/668 |
| 3,408,995 | 11/1968 | Johnson | 123/668 |
| 3,412,931 | 11/1968 | Palmer | 251/368 |
| 3,636,605 | 1/1972 | Vitcha et al. | 123/188 AA |
| 3,837,356 | 9/1974 | Selep et al. | 251/368 |
| 3,917,110 | 11/1975 | Kiguchi | 251/368 |
| 4,074,671 | 2/1978 | Pennila | 123/668 |

FOREIGN PATENT DOCUMENTS 2729230  1/1979  Fed. Rep. of Germany ...... 123/668

OTHER PUBLICATIONS

Rose, Arthur and Elizabeth, *The Condensed Chemical Dictionary*, Reinhold, New York, 1965, pp. 1019-1020.
Kamo, R., "Cycles and Performance Studies for Advanced Diesel Engines". In: *Ceraminics for High Pressure Applications—II* (1978), Chapter 47, p. 916.

*Primary Examiner*—Craig R. Feinberg
*Assistant Examiner*—W. R. Wolfe
*Attorney, Agent, or Firm*—Oblon, Fisher, Spivak, McClelland & Maier

[57] ABSTRACT

A valve for an internal combustion engine formed of ceramic material for resistance to corrosion, heat and wear. The valve may include a valve tip, a lock groove, a valve stem, a valve fillet, a valve face, a valve margin and a valve head. Certain portions of the valve, such as the valve tip, the lock groove and the valve stem may, alternatively, be formed of metal. The ceramic material includes, among other compositions, silicon nitride, silicon carbide, aluminum nitride, silicon oxynitride, silicon aluminum oxynitride and silicon nitride-silicon carbide.

8 Claims, 3 Drawing Figures

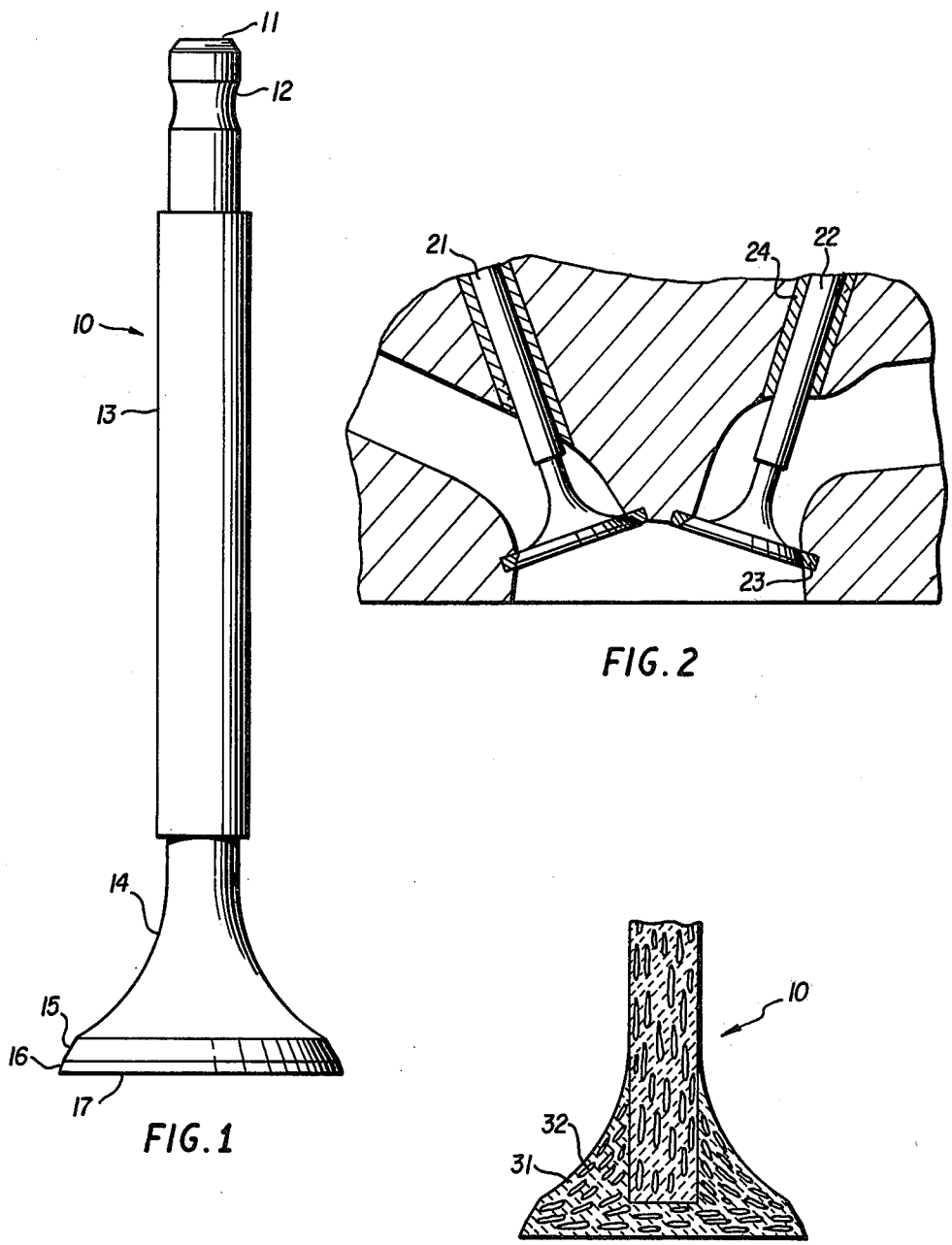

VALVE FOR AN INTERNAL COMBUSTION ENGINE

BACKGROUND OF THE INVENTION

1. Field of the Invention

This invention relates to a valve for use in an internal combustion engine.

2. Description of the Prior Art

As well known, special steel has been used in the valves for an internal combustion engine. However, valves formed of special steel have exhibited shortcomings with regard to resistance to corrosion, heat and wear.

SUMMARY OF THE INVENTION

Accordingly, it is an object of this invention to provide a valve for use in an internal combustion engine exhibiting good corrosion resistance.

It is another object of this invention to provide a valve for use in an internal combustion engine having good heat resistance.

It is another object of this invention to provide a valve for use in an internal combustion engine demonstrating good wear resistance.

These and other objects have now herein been attained by providing a valve for use in an internal combustion engine formed of ceramic materials.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

FIG. 1 is an elevational view of a valve according to the present invention;

FIG. 2 is a fragmentary, vertical, sectional view of a valve arrangement in accordance with the present invention; and FIG. 3 is a pictorial, fragmentary, vertical, sectional view of a valve according to the present invention.

DETAILED DESCRIPTION OF THE PREFERRED EMBODIMENTS

FIG. 1 illustrates a poppet valve 10 having a valve tip 11, a lock groove 12, a valve stem 13, a valve fillet 14, a valve face 15, a valve margin 16 and a valve head 17. FIG. 2 illustrates a valve arrangement having an inlet valve 21, an exhaust valve 22, a valve seat 23 and a valve guide 24.

The valve of this invention constitutes a ceramic body. The valve is used in such a manner as to require great resistance to high temperature gas and great wear resistance. For instance, the valve head, the valve margin, the valve face, the valve fillet and a part of the valve stem are exposed to combustion gas. The valve face 15 touches the valve seat 23 and the valve stem 13 contacts the valve guide 24. Therefore, preferably, the valve head, the valve margin, the valve face and the valve fillet are formed of ceramic material. Additionally, the valve stem is formed of ceramic material. Preferably, the ceramic material constitutes such materials as, for example, silicon nitride, aluminum nitride, silicon carbide, silicon oxynitride, silicon aluminum oxynitride and silicon nitride-silicon carbide so as to obtain good resistance to corrosion, head and wear.

Hot pressing, reaction sintering, furnace sintering and other well-known sintering methods are used to obtain the ceramic valve of this invention. Where the valve of this invention is formed by hot pressing, it is easy to arrange the fiber-like structure 32 of the sintered body as shown in FIG. 3 such that the fiber like structure 32 in the top portion 31 is substantially parallel to adjacent surface portions of said valve top portion.

The valve in FIG. 3 is formed by the steps of preparing the pole portion of poppet valve 10 by hot pressing compositing the sole portion to a ceramic powder mass so as to be formed with or connected to the top portion 31 by hot pressing. The valve as so arranged exhibits great mechanical strength. Therefore, the valve, as shown in FIG. 3, will be useable for a relatively long period of time.

It is desirable that the valve of this invention be subjected to surface finishing to improve its surface condition. The desirable surface roughness is less than about 2S (The dimension "S" is used to indicate the surface roughness of the members according to the Japanese Industrial Standard B 0601.).

Where the valve of this invention is formed by furnace sintering or hot pressing, it is easy to obtain a valve having a density higher than 90% of the theoretical valve. It is also relatively easy to obtain a valve having a flexural strength greater than 50 kg/cm$^2$ at 800° C. where the valve is, for example, formed of silicon nitride, silicon carbide, aluminum nitride, silicon oxynitride, silicon aluminum oxynitride or silicon nitride-silicon carbide. Both values of density and flexural strength are quite sufficient for the valve of the present invention when used in an internal combustion engine.

The valve of this invention may also be formed so as to include a ceramic portion and a metal portion. For instance, the valve tip 11, the lock groove 12 and the valve stem 13 may be formed of metal.

The following are examples of the valve of this invention and of the steps utilized in preparing such valve:

EXAMPLE I

A powder mixture consisting of 80% by weight of silicon nitride, 10% by weight of yttrium oxide and 10% by weight of aluminum oxide, the mean particle size thereof being 1.5, 1.6 and 1.1 microns, respectively, was initially prepared. The powder mixture was sintered by hot pressing, the size thereof being 200 mm×50 mm×15 mm, at a pressure of 400 kg/cm$^2$, at 1750° C. for 20 minutes in an atmosphere of nitrogen gas. The sintered plate was cut and ground to obtain a pole-shaped body having a circular cross-section. On the other hand, the top portion, shaped body of the valve formed of the above-mentioned powder mixture was prepared by molding. The molded top portion, shaped body was composited with the pole-shaped sintered, body by hot pressing, the hot pressing condition thereof being at a pressure of 300 kg/cm$^2$ at 1750° C. for 1 hour in an atmosphere of nitrogen gas. The composited body had the arranged structure as shown in FIG. 3. The valve fillet portion 31 was surfaced-finished to obtain a mirror-like surface by grinding.

The valve obtained by the above-mentioned process had a flexural strength of 105 kg/cm$^2$ and a density of 3.25 g/cm$^3$. The valve was set in an internal combustion engine and then tested for 3000 hours. As a result, no corrosion was detected.

EXAMPLE II

The powder mixture identical to that of Example I was initially prepared. The powder mixture was molded in a valve shaped by rubber pressing, the size thereof being 13 mm in diameter for the stem portion, 40 mm in diameter for the head portion and 250 mm in length. The molded body was sintered by hot pressing at a pressure of 300 kg/cm$^2$ at 1780° C. for 70 minutes in an atmosphere of nitrogen gas. The valve obtained by the above-mentioned process had a flexural strength of 95 kg/cm$^2$ and a density of 3.25 g/cm$^3$. The valve was set in an internal combustion engine and tested for 3000 hours. As a result, no corrosion was detected.

Obviously, many modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A valve for use in an internal combustion engine, said valve consisting essentially of ceramic material and wherein said valve further comprises a valve stem including fiber-like structure oriented along a longitudinal axis of said valve stem, said valve stem extending in the lengthwise dimension of said valve and a valve top portion including a fiber-like structure oriented so as to be substantially parallel to adjacent surface portions of said valve top portion.

2. The valve according to claim 1, said valve having surface roughness of less than 2S wherein S indicates surface roughness according to Japanese Industrial Standard B 0601.

3. The valve according to claim 1, wherein said valve further comprises a hot pressed valve.

4. The valve according to claim 1, wherein said valve is of a density higher than 90% of theoretical density.

5. The valve according to claim 1, wherein said valve has a flexural strength greater than 50 kg/cm$^2$ at 800° C.

6. The valve according to claim 1, wherein said ceramic material comprises silicon nitride.

7. A valve according to claim 1, said valve comprising a poppet valve for said internal combustion engine.

8. A valve according to claim 7, said poppet valve comprising a valve tip, said valve including a lock groove portion formed therein adjacent said valve tip, a valve stem, a valve face, a valve fillet interconnecting said valve stem and said valve face, a valve head and a valve margin positioned between said valve face and said valve head.

* * * * *